United States Patent Office 3,447,577
Patented June 3, 1969

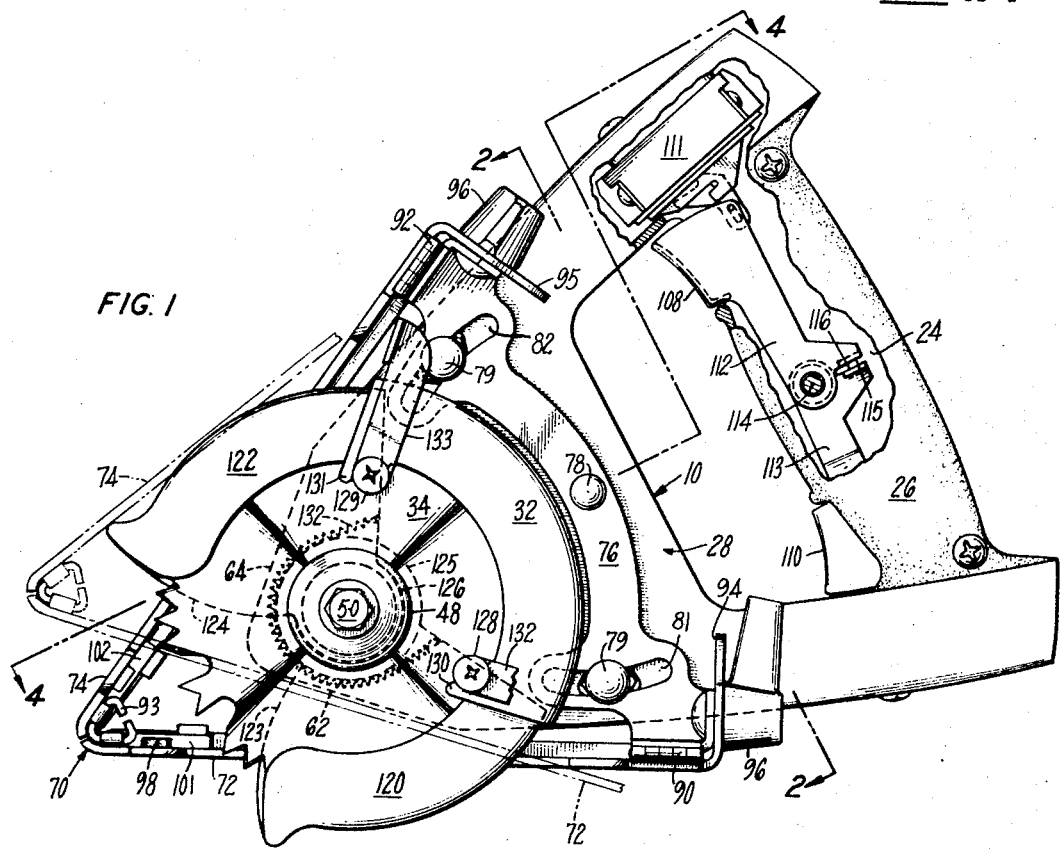

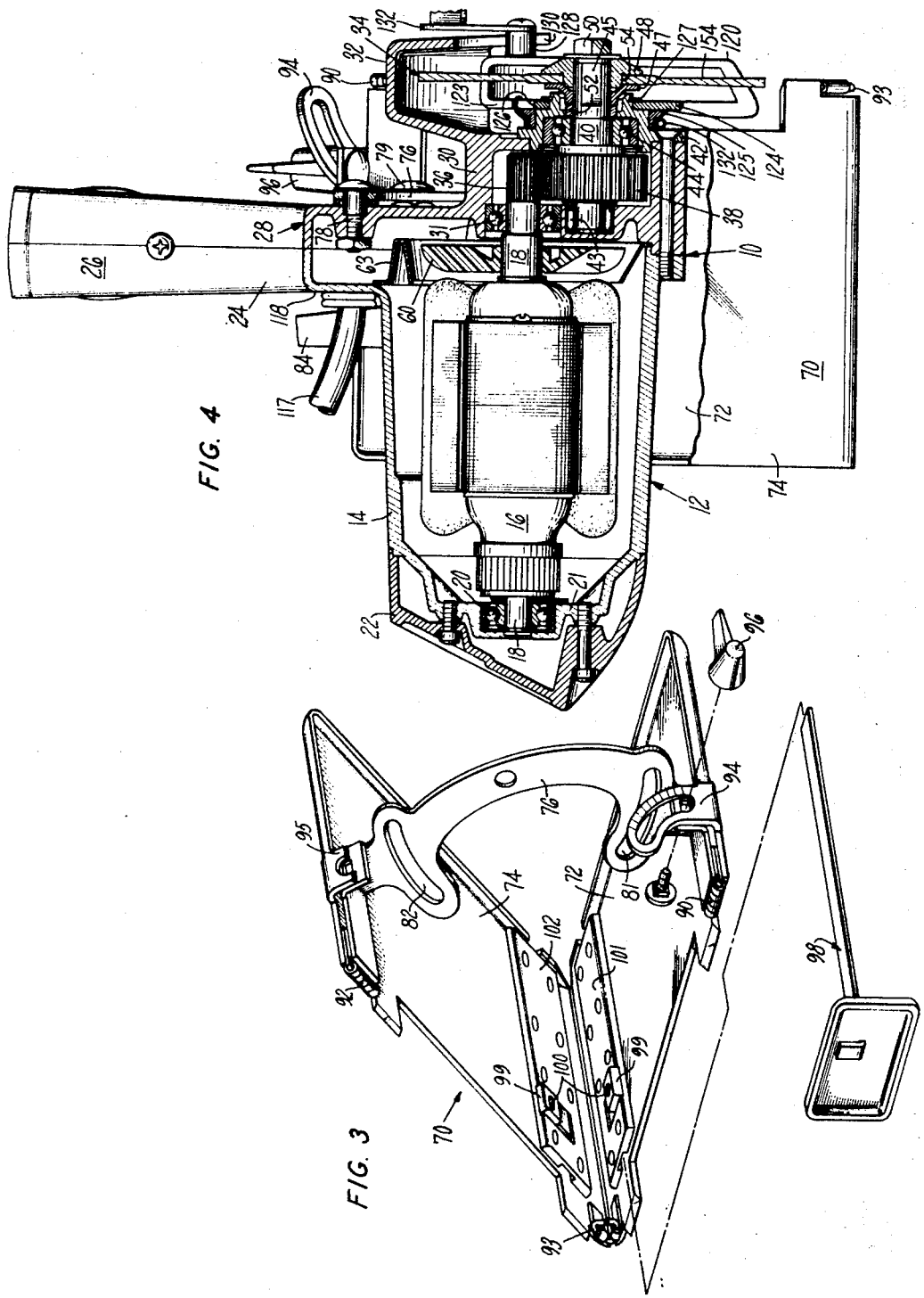

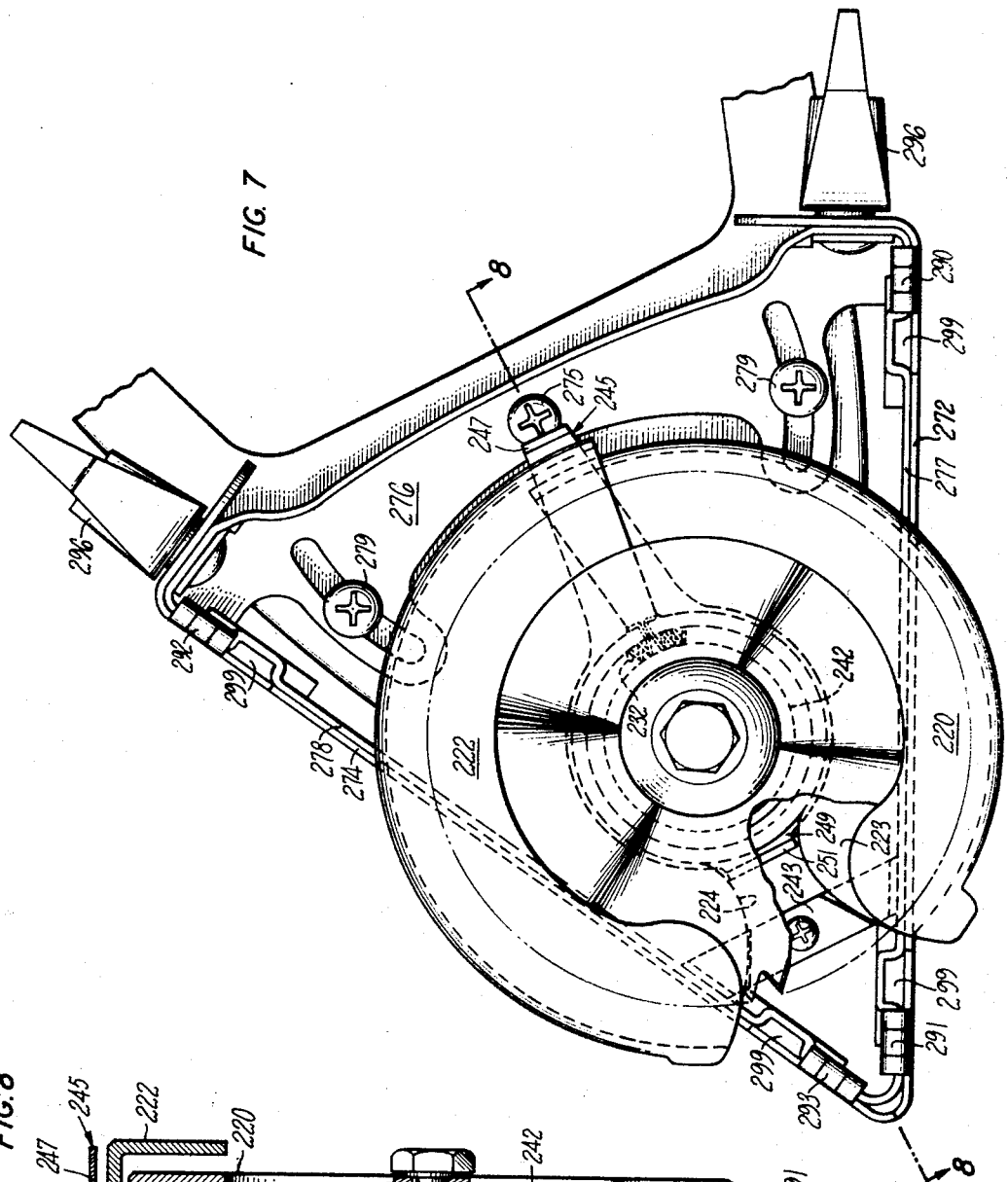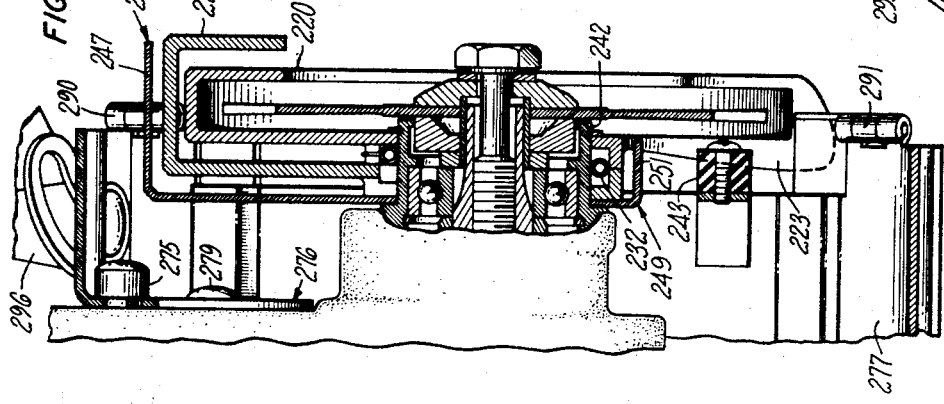

3,447,577
CIRCULAR TRIM SAW
Milford D. Burrows, Avon, and Phillipp J. Quedens, Newington, Conn., assignors to The Stanley Works, New Britain, Conn., a corporation of Connecticut
Filed June 13, 1966, Ser. No. 557,205
Int. Cl. B27b *9/00*
U.S. Cl. 143—43                    17 Claims

ABSTRACT OF THE DISCLOSURE

A portable circular hand saw having a reversible electric motor, a spade handle at one side of the circular saw blade having trigger switches at opposite ends thereof for respectively operating the reversible motor for rotating the saw blade in opposite rotational directions, and a V-shaped base with independently pivotal base portions which cooperate with the saw blade for supporting the saw blade in each of two operational positions. The V-shaped base is symmetrically located with respect to the spade handle such that the saw may be used as either a left-sided hand saw or a right-sided hand saw and the trigger switches may be operated by the index finger in each operational position of the saw to operate the reversible motor in accordance with the left-sided or right-sided use of the saw.

---

The present invention generally relates to portable circular saws and is more particularly directed to a novel portable circular saw having greater operating flexibility.

It is a primary aim of the present invention to provide a new and improved portable circular saw which is adapted for reversible operation and to be selectively operated to saw, etc., in either direction of operation.

It is another aim of the present invention to provide a reversible portable circular saw which may be easily manipulated in either direction of operation.

It is a further aim of the present invention to provide a reversible portable circular saw having substantially the same operational characteristics and adapted to be manipulated in substantially the same manner in both directions of operation.

It is a still further aim of the present invention to provide a new and improved portable circular saw which provides for substantially flush cutting, trimming, etc., up to an abutting surface in both directions of operation.

It is another aim of the present invention to provide a portable circular saw which is adapted for finish cutting, trimming, etc., and which is useable as a laminate cutter and as a fine finish saw.

It is another aim of the present invention to provide a novel saw blade guard arrangement for a reversible portable circular saw.

It is another aim of the present invention to provide a new and improved reversible rotary saw blade for a portable circular saw for sawing in both rotational directions of operation.

It is another aim of the present invention to provide an improved portable circular saw which is selectively operable to drive its circular saw blade in either rotational direction in accordance with the direction of cut desired.

It is a still further aim of the present invention to provide a portable circular saw having a new and improved handle and operating trigger arrangement which permits the saw to be appropriately manipulated and controlled in accordance with the desired direction of cut.

It is a further aim of the present invention to provide a reversible portable circular saw of compact and economical construction which is adapted to provide substantially service free operation over a long useful life.

It is another aim of the present invention to provide a portable circular saw having a base assembly which provides for employing the circular saw as either a "right-sided" saw or as a "left-sided" saw.

It is another aim of the present invention to provide a portable circular saw having a base assembly which provides for supporting the circular saw in two operational positions having different depths of cut and/or different angles of cut.

It is a further aim of the present invention to provide a portable circular saw having a base assembly which provides for supporting the circular saw in two operational positions and which is adjustable to vary the depths and angles of cut of the circular saw in each of the operational positions.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 1 is a side elevation view, partly broken away and partly in section, of a portable circular saw incorporating the present invention and showing a base assembly thereof in full lines in one adjusted position and in part in broken lines in another adjusted position;

FIG. 2 is a partial longitudinal section view, partly broken away and partly in section, taken substantially along line 2—2 of FIG. 1;

FIG. 3 is a partially exploded isometric view showing the base assembly of the circular saw and a rip guide attachment therefor;

FIG. 4 is a longitudinal section view partly broken away and partly in section taken substantially along line 4—4 of FIG. 1;

FIG. 7 is a side elevation view, partly broken away and partly in section, of a modified portable circular saw incorporating the present invention; and FIG. 8 is a partial longitudinal section view, partly broken away and partly in section, taken substantially along line 8—8 of FIG. 7.

Figure 5:
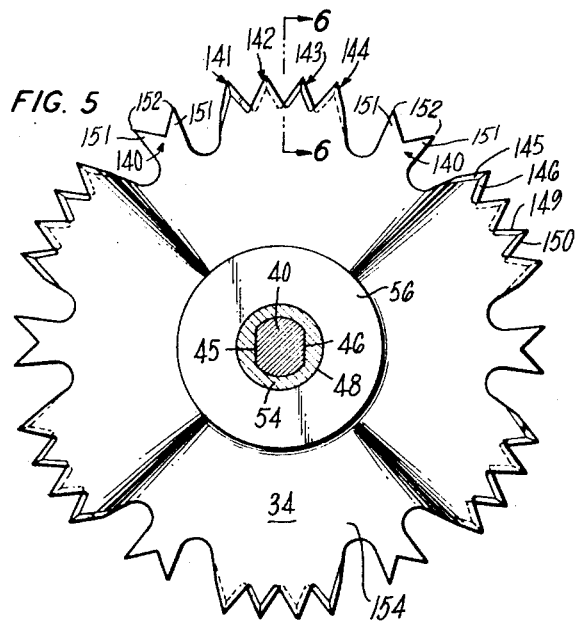
FIG. 5 is an enlarged transverse section view, partly in section, showing a plan view of the saw blade of the circular saw.

Referring now to FIGS. 1–6 of the drawings in detail, an embodiment of a portable circular saw incorparting the present invention is shown comprising a multipart housing 10 which includes a main housing part 12 having an elognated motor housing portion 14 which is contoured to receive a reversible electric motor 16.

The reversible electric motor 16 may for example have a no load speed of approximately 28,000 r.p.m. and be capable of developing a rated power of ¾ HP at approximately 19,000 r.p.m. so that the speed slope is not critical to performance. The outer end of the motor shaft 18 is supported by a bearing 20 within a transverse bridge portion 21 of the main housing part 12. A housing cover part 22 having suitable air inlet openings, not shown, is secured to the outer end of the elongated motor housing portion 14 with suitable fasteners.

The inner end of the main housing part 12 is formed to provide a one-half portion 24 of a spade handle 26 extending transversely of the axis of the motor 16. The other half of the spade handle 26 is formed by a housing part 28 suitably secured to the main housing part 12 and providing an end support 30 for an inner shaft bearing 31. The housing part 28 is also formed to provide a fixed arcuate guard 32 at the inner end of the saw which is adapted to enclose a portion of the periphery of the circular saw blade 34.

The inner end of the motor shaft 18 is machined to provide a drive gear 36. A driven gear 38 in mesh with the drive gear 36 is press fit on an arbor or shaft 40 which is suitably supported on the end support 30 and on a gear cover 42 with bearings 43, 44. The gears 36, 38 for example provide a reduction ratio of 34:9 which provides a no load output speed of approximately 7,500 r.p.m. and a rated load output speed of approximately 5,000 r.p.m.

The inner end of the arbor 40 is provided with axially extending parallel flats 45, 46, and saw blade support flanges 47, 48 having central openings conforming to the transverse cross section of the inner end of the arbor 40 are mounted on the arbor for supporting the saw blade 34 coaxially thereon. A machine screw fastener 50 threaded into the end of the arbor 40 and suitable washers mounted between the machine screw 50 and the flange 48 are employed to securely retain the flange and blade assembly against a spacer sleeve 52. The flange 48 has a cylindrical hub 54 which is received within a conforming central circular opening in the saw blade, and the flanges 47, 48 frictionally engage the enlarged central hub portion 56 of the saw blade to provide a frictional drive which permits movement of the saw blade relative to the shaft 40 to protect the arbor drive during impact loads.

The end support 30 of the housing part 28 is formed with suitable air outlet openings, not shown, to provide for exhausting cooling air from the motor housing. A plastic fan 60 having flat radially extending blades is press fit on the inner end of the motor shaft 18 and a plastic fan baffle 63 is supported about the fan 60 between the housing parts 12, 28 to provide for directing cooling air from the air inlet openings in the housing cover 22 to the air outlet openings in the end support 30. The fan 60 and fan baffle 63 are designed to provide for directing the air in this manner irrespective of the direction of rotation of the reversible motor 16.

As best seen in FIGS. 1 and 4 the described multipart housing 10 includes an elongated housing in which the drive motor and the drive train comprising the drive pinion 36, the driven gear 38 and the shaft 40 are mounted. The forward end of the longitudinal housing has flat sides 62, 64 (FIG. 1) which extend parallel to the axis of the motor 16 and at approximately right angles to each other. The flat sides 62, 64 thereby provide a V-shaped forward end which provides for presenting peripheral portions of the saw blade 34 at the angularly spaced sides 62, 64 of the elongated housing. Also the spade handle 26 extends rearwardly of the elongated housing symmetrically with respect to the sides 62, 64 and adjacent to but outwardly of the fixed guard 32.

A base assembly generally denoted by the numeral 70 is shown having a pair of sheet metal bases 72, 74 mounted adjacent the sides 62, 64 of the housing respectively. With this base assembly design the base 72 is used to support the circular saw when it is employed as a "left-sided" saw and the base 74 is used to support the circular saw when it is employed as a "right-sided" saw. Therefore the circular saw is adapted to be changed from a "right-sided" saw to a "left-sided" saw, or vice versa, merely by "turning the saw over." This has the effect of turning the spade handle approximately 122°.

A base bracket 76 is pivotally supported on the end support 30 by a shoulder screw 78 and by guide screws 79 which extend through the fasteners 80 of the housing and the arcuate slots 81, 82 of the bracket. Accordingly, the entire base assembly may be adjusted about an axis parallel to the axis of rotation of the saw blade for varying the positions of the bases 72, 74 with respect to the saw blade to adjust the depth of cut available with each of the bases. The arcuate slots 81, 82 provide for limiting the movement of the base assembly 70 and a wing nut 84 on one of the screws 79 provides for locking the base assembly in its adjusted position. An acorn nut 85 is used on the other screw 79 so that the wing nut 84 alone can be employed to loosen the bracket and to lock the bracket in its adjusted position.

The bases 72, 74 are mounted on the bracket 76 by the hinges 90, 92 respectively for independent pivotal movement about axes lying substantially in the plane of the saw blade 34. The bases 72, 74 are also connected at their forward ends by a swivel pin 93 having portions aligned with the axes of the hinges 90, 92 respectively. Depending tabs 94, 95 on the bases having suitable arcuate slots which receive releasable lock fasteners 96 are provided for individual adjustment of the angle of the bases. In the shown embodiment the tabs 94, 95 are slotted to provide for adjustment of the bases through approximately 45° from the 90° position shown. Thus, it can be seen that the bases 72, 74 can be independently adjusted for either straight or bevel cutting.

Referring to FIG. 3 suitable rip guide supports 101, 102 are fixed to the underside of the base plates 72, 74 adjacent the forward ends thereof to provide axially extending tracks or guideways for adjustably supporting a rip guide attachment 98. Locking shoes or nuts 99 are mounted in transverse slots in the supports 101, 102 for locking the rip guide in its adjusted position. The locking shoes have threaded openings 100 which receive threaded fasteners having heads recessed in the outer face of the base plates and which therefore provide for drawing the shoes 99 toward the inner face of the base plates 72, 74 to clamp the rip guide attachment 98 in its adjusted position. Accordingly, the rip guide attachment may be readily adjusted and then reclamped in position with the locking shoes 99 and the associated fasteners.

The spade handle 26 is designed to be grasped with either the left hand or right hand in either of its operating positions. Suitable triggers 108, 110 are shown mounted at opposite ends of the spade handle upon lever portions 112, 113 pivotally supported centrally of the spade handle on stud 114. A pair of switches 111, only one of which being shown in the drawings, are mounted in the support sections of the spade handle for operation by the triggers 108, 110 respectively. The switches 111 are suitably connected to the electric motor 16 for operating the motor in opposite rotational directions, and the lever portions 112, 113 have opposed upstanding tabs or abutments 115, 116 which are engageable to enable only one of the triggers 108, 110 to be depressed at a time. The electric cord 117 of the saw is attached to project outwardly from the center portion of the handle horn 118 to keep it out of the way during both "right-sided" and "left-sided" operation of the saw.

When using the circular saw as a "left-sided" saw, the trigger 108 at the upper end of the spade handle would be operated by the index finger of the handle hand to control the operation of the motor, it being understood that the trigger 108 is employed to rotate the saw blade in the clockwise direction as seen in FIG. 1. If, however, it is desired to rotate the saw blade 34 in the opposite angular direction the trigger 110 can be readily actuated with the small finger of the handle hand. When using the circular saw as a "right-sided" saw, the trigger 110 would be actuated by the index finger of the handle hand to drive the saw blade in the counter-clockwise direction as seen in FIG. 1, and the trigger 108 could be actuated by the small finger of the handle hand for reverse operation of the saw blade.

A saw blade guard arrangement is provided which includes the fixed guard 32 and a pair of pivotal arcuately shaped guards 120, 122. The fixed guard 32 is mounted rearwardly of the axis of the saw blade and symmetrically with respect to the forward sides 62, 64 of the housing and symmetrically with respect to the bases 72, 74 and is adapted to receive the pivotal guards 120, 122 as they are pivotally withdrawn from their fully extended positions shown in FIG. 1.

The pivotal guards 120, 122 have supporting webs 123, 124 and hubs 125, 126 at the inner ends thereof which are retained on stepped cylindrical portions of the gear cover 42 by a suitable snap ring 127. Each of the pivotal guards has a design somewhat similar to the design of the pivotal guard shown in U.S. Patent No. 2,828,784 of Kestutis Damijonaitis, dated Apr. 1, 1958 and entitled Saw Blade Guard for Power Driven Portable Circular Saw With Tiltable Table. The pivotal guards are provided with upstanding abutments or bumpers 128, 129 respectively which are adapted to engage the end stops 130, 131 formed on the outer side face of the fixed guard 32 to limit the outward movement of the pivotal guards. A tension or garter spring 132 partly wound about the supporting hub 125 of the pivotal guard 120 and connected between the pivotal guards 120, 122 provides for biasing the guards outwardly to their fully extended positions.

In operation, the pivotal guard lying beneath the base plate supporting the circular saw is caused to be retracted into the fixed guard while the saw is pushed forwardly by the operator, during which operation the other or upper guard acts as a safety shield for the upper peripheral portion of the saw blade and as a saw dust collector or chute. If it is desired to pull the saw rearwardly, the lower pivotal guard can be manually retracted by the appropriate lever 132, 133 mounted on the end of the bumpers 128, 129 respectively.

Figure 6:
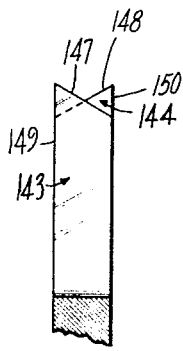
FIG. 6 is an enlarged fragmentary transverse section view of the saw blade taken along line 6—6 of FIG. 5.

Referring now to FIGS. 5 and 6 the saw blade 34 has a relatively small diameter of 4" so that it will provide a large cutting force at the relatively high speed at which it is driven and thus be able to produce a smooth finish cut in laminates and in hard or soft wood. The saw blade 34 is shown formed with chip clearing or raker teeth 140 and groups of four radially projecting cutting teeth 141–144 having opposed edges 145, 146 which are alternately beveled on opposite sides of the teeth. The cutting teeth are thereby formed with opposed radially extending cutting edges 149, 150 for cutting in both directions of rotation and with the cutting edges 149, 150 of adjacent teeth on opposite sides of the blade. The cutting teeth 141–144 are also formed with peripheral cutting edges 147, 148 which are coplanar with the axis of the blade and which are alternately inclined in opposite axial directions toward the axis of the blade.

The raker teeth 140 are formed with pairs of oppositely extending tooth portions 151 having straight edges 152 parallel to the axis of the blade which function as chip clearers, for which purpose they are dimensioned to terminate slightly below the cutting circle of the cutting teeth 141–144.

In transverse section as seen in FIG. 4, the blade comprises the enlarged central hub portion 56 and an annular portion 154 which is tapered inwardly from the outer periphery of the cutting teeth toward the central hub and which has a thickness at the periphery of the teeth substantially equal to the thickness of the central hub.

In the modified embodiment of the portable circular saw of the present invention shown in FIGS. 7 and 8, a pair of telescoping arcuately saaped pivotal guards 220, 222 are mounted on a cylindrical end of a gear cover 242. A tension or garter spring 232 is also wound about the cylindrical end of the gear cover 242 within an annulus formed within the supporting hubs of the guards 220, 222, and the ends of the tension spring 232 are suitably connected to the guards for biasing them to their forward extended positions shown in FIG. 7 in engagement with an end stop 243.

The guards may be caused to be retracted from their extended positions into nesting relationship through engagement with the workpiece or may be selectively manually retracted by a lever 245 pivotally mounted on the cylindrical end of the gear cover 242. The lever 245 has a rearwardly extending lever portion 247 which is accessible for conveniently manipulating the lever and a forward lever portion 249 having an upstanding end 251 lying between the forward ends of the webs 223, 224 of the guards 220, 222.

The base assembly comprises a sheet metal base bracket 276 which is pivotally supported by shoulder screw 275 and guide screws 279 and which is pivotally adjusted in the manner of the embodiment of FIGS. 1–6. The base bracket 276 is integrally formed with base supporting platforms 277, 278 which together form a V-shaped sheet metal support for the bases 272, 274. The supporting platforms 277, 278 extend parallel to the axis of the saw blade and are therefore adapted to rigidly support the bases 272, 274 with the bases 272, 274 in their 90° positions shown in FIGS. 7 and 8. The bases 272, 274 are pivotally mounted on the platforms 277, 278 by the spaced hinges 290, 291 and 292, 293 respectively for pivotal movement about axes lying substantially in the plane of the saw blade. The bases are adapted to be independently pivotally adjusted in the manner of the embodiment of FIGS. 1–6 by the releasable lock fasteners 296.

The end stop 243 is mounted to the inside surface of the supporting platforms 277, 278 to provide for properly limiting the forward pivotal position of the guards 220, 222 in all pivotal positions of the base bracket 276. The supporting platforms are also contoured to provide suitable channels 299 for receiving a suitable rip guide attachment which may be mounted to the underside of the bases 272, 274 in the manner of the embodiment of FIGS. 1–6.

Thus it can be seen that the portable circular saw of the present invention provides for substantially improved flexibility of operation and for reversing the direction of operation of the saw by merely reversing the direction of rotation of the saw blade or by additionally turning the circular saw over. Also the portable circular saw of the present invention can be pushed away from the operator or pulled towards the operator with the saw used as either a "left-sided" saw or a "right-sided" saw. Further the base assembly of the circular saw provides for positioning the saw in two operating positions and for setting the depth of cut and the angle of cut at each operating position. Moreover, the handle and trigger arrangement of the saw are constructed for convenient and normal operation of the saw in both of its operating positions and for selectively operating the saw blade in either rotational direction in each operating position of the saw.

As will be apparent to persons skilled in the art, various modifications and adaptations of the structure above described will become readily apparent without departure from the spirit and scope of the invention, the scope of which is defined in the appended claims.

We claim:

1. In a portable circular hand saw having drive means with a rotary output and a drive motor connected for driving the rotary output, a circular saw blade mounted on the rotary output for being driven thereby, operating means for operating the drive means, and control means for supporting and manually manipulating the portable circular hand saw, the improvement wherein the drive means is adapted to be selectively operated for selectively rotating the rotary output in each rotational direction for selectively rotating the saw blade in each rotational direction, wherein the control means comprises handle means on one side of the saw blade and base means for supporting the hand saw and which together provide for supporting and manually manipulating the portable circular hand saw as either a right-sided saw or as a left-sided saw with the handle means respectively on the left side and right side of the saw blade with respect to the saw operator, and wherein the operating means is manually selectively operable for selectively operating the drive means for rotating the rotary output and therefore the circular saw blade in the rotational direction appropriate to the right-sided and left-sided use of the saw.

2. In the portable circular saw of claim 1 wherein the handle means may be manually grasped in either of two reverse positions for operating the portable circular saw as a left-sided saw and as a right-sided saw respectively.

3. In the portable circular saw of claim 2 wherein the operating means comprises a pair of switch triggers on the handle means connected for rotating the drive motor in opposite rotational directions and mounted for operation by the index finger of the handle hand with the handle means grasped in the two reverse positions respectively.

4. In the portable circular saw of claim 1 wherein the base means is adapted for supporting the circular saw in at least two separate operating positions having an angular separation of between 90° and 180° about an axis parallel to the saw blade axis, and wherein the handle means provides for manipulating the saw in each operating position.

5. In the portable circular saw of claim 4 wherein the handle means comprises a fixed spade handle which may be manually grasped in either of two reverse positions and which is substantially symmetrically located with respect to said two operating positions of the circular saw.

6. In a portable circular saw having drive means, a circular saw blade rotatable by the drive means, operating means for operating the drive means, and control means for supporting the portable circular saw, and for manipulating the portable circular saw, the improvement wherein the drive means is adapted for rotating the saw blade in both rotational directions, wherein the control means is adapted for operation of the portable circular saw as either a right-sided saw or as a left-sided saw, wherein the operating means is adapted for selectively operating the drive means for rotating the circular saw blade in either rotational direction, wherein the control means comprises base means for supporting the circular saw in at least two operating positions and handle means for selectively manipulating the saw in both operating positions, and wherein the base means comprises supporting bracket means, a pair of bases independently pivotally mounted on the supporting bracket means about axes extending generally perpendicular to the axis of the saw blade, and adjusting means for adjusting the depth of cut and for pivotally adjusting the bases about said axes for adjusting the angle of cut.

7. In the portable circular saw of claim 6 wherein the bracket means comprises a bracket supported for pivotal movement about an axis substantially parallel to the axis of the saw blade, and wherein the adjusting means provides for pivotally adjusting the bracket for adjusting the depth of cut.

8. In the portable circular saw of claim 7 wherein the bracket is pivotally supported rearwardly of the axis of the saw blade, wherein the bases are pivotally mounted on the bracket at transversely spaced points and the forward ends of the bases are connected for independent pivotal movement of the bases about their pivotal axes respectively, wherein the drive means comprises a reversible rotary electrical motor, wherein the handle means is a fixed spade handle which may be manually grasped in either of two reverse positions, and wherein the operating means comprises switch triggers at opposite ends of the spade handle connected for operating the electrical motor in opposite rotational directions.

9. In the portable circular saw of claim 6 wherein the bracket means comprises a pair of base supporting platforms extending substantially parallel to the axis of the saw blade and together forming a generally V-shaped support for the pair of bases respectively.

10. In the portable circular saw of claim 1 wherein the drive motor is a reversible rotary electric motor, and wherein the operating means comprises a pair of switch triggers on the handle means connected for operating the electrical motor in opposite rotational directions.

11. In the portable circular saw of claim 10 wherein the handle means comprises a handle which may be manually grasped for operating the portable circular saw as a right-sided saw or as a left-sided saw, and wherein the switch triggers are mounted at opposite ends of the handle for operation by the index finger of the handle hand with the saw employed as a right-sided saw and as a left-sided saw respectively.

12. In the portable circular saw of claim 4 having guard means for the circular saw blade comprising a pair of saw blade guards pivotally mounted substantially coaxially with the saw blade and having extended pivotal positions for guarding different peripheral portions of the saw blade corresponding to the separate operating positions respectively of the hand saw, the saw blade guards being adapted to be individually withdrawn from their extended pivotal positions for selectively uncovering said differential peripheral portions of the saw blade.

13. In the portable circular saw of claim 12 wherein the pair of saw blade guards are dimensioned for telescoping relationship for withdrawing the guards from their extended pivotal positions into nesting relationship.

14. In the portable circular saw of claim 1 wherein the circular saw blade is contoured to cut in both directions of rotation.

15. In the portable circular saw of claim 14 wherein the circular saw blade comprises clearing teeth and a plurality of cutting teeth between the clearing teeth having opposed beveled edges providing opposed cutting edges for cutting in opposite directions of rotation, the teeth being beveled from alternate sides of the teeth to provide cutting edges on both sides of the teeth.

16. In the portable circular saw of claim 1 having a rip guide attachment for guiding the saw, wherein the portable circular saw comprises mounting means for mounting the rip guide attachment on the inner side of the base means permitting adjustment thereof parallel to the axis of the saw blade and including locking means for locking the rip guide attachment in its adjusted position, the locking means including a clamping shoe mounted on the inner side of the base means for clamping the rip guide attachment in its adjusted position to the inner side of the base means, and fastener means having a head recessed in the outer side of the base means and threaded into the clamping shoe for clamping and unclamping the rip guide attachment.

17. In a portable circular saw having a rotary electrical motor, a circular saw blade mounted for rotation by the electric motor, base means for supporting the circular saw, manual means for operating the electric motor, handle means for manipulating the portable circular saw, a rip guide attachment for guiding the saw, and mounting means for mounting the rip guide attachment on the inner side of the base means permitting adjustment thereof parallel to the axis of the saw blade and including locking means for locking the rip guide attachment in its adjusted position, the improvement wherein the locking means comprises a clamping shoe mounted on the inner side of the base means for clamping the rip guide attachment in its adjusted position to the inner side of the base means, and fastener means having a head recessed in the outer side of the base means and threaded into the clamping shoe for clamping and unclamping the rip guide attachment.

References Cited

UNITED STATES PATENTS

| | | | |
|---|---|---|---|
| 3,352,368 | 11/1967 | Maffey | 310—50 XR |
| 2,744,176 | 5/1956 | Kaman | 310—50 XR |
| 2,828,784 | 4/1958 | Damijonaitis | 143—159 |
| 2,726,689 | 12/1955 | Busby. | |
| 2,737,213 | 3/1956 | Richards et al. | 143—43 |

(Other references on following page)

| | | | | | | |
|---|---|---|---|---|---|---|
| 2,543,486 | 2/1951 | Briskin | 143—59 | 318,938 | 6/1885 | Allen | 143—133 |
| 2,246,761 | 6/1941 | Saliba et al. | | 2,945,517 | 7/1960 | Sower et al. | 144—309 XR |
| 1,830,151 | 11/1931 | Wilderson | 143—159 | | | | |
| 1,531,675 | 3/1925 | Mattson | 143—133 | | | | |
| 1,399,738 | 12/1921 | Bonelli | 143—43 | | | | |
| 963,520 | 7/1910 | Costello | 143—43 | | | | |
| 572,604 | 12/1896 | Harman | 143—133 | | | | |

FRANCIS S. HUSAR, *Primary Examiner.*

U.S. Cl. X.R.

143—159